(12) United States Patent
Smith et al.

(10) Patent No.: US 12,278,328 B2
(45) Date of Patent: Apr. 15, 2025

(54) MOUNTING CLAMPS FOR SECURING GROUPINGS OF BATTERY CELLS

(71) Applicant: FORD GLOBAL TECHNOLOGIES, LLC, Dearborn, MI (US)

(72) Inventors: Micah Joel Smith, Berkley, MI (US); Yongcai Wang, Ann Arbor, MI (US); George Albert Garfinkel, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 865 days.

(21) Appl. No.: 17/034,326

(22) Filed: Sep. 28, 2020

(65) Prior Publication Data

US 2021/0013468 A1    Jan. 14, 2021

Related U.S. Application Data

(63) Continuation of application No. 15/817,697, filed on Nov. 20, 2017, now Pat. No. 10,826,034.

(51) Int. Cl.
*H01M 50/244* (2021.01)
*B60L 50/00* (2019.01)
(Continued)

(52) U.S. Cl.
CPC ......... *H01M 10/0525* (2013.01); *B60L 50/00* (2019.02); *H01M 50/244* (2021.01);
(Continued)

(58) Field of Classification Search
CPC .. H01M 50/20; H01M 50/202; H01M 50/204; H01M 50/244; H01M 50/249; H01M 50/258; H01M 50/256; H01M 50/262; H01M 50/264; H01M 50/271; B60R 16/04; B60K 1/04; B60K 6/28;
(Continued)

(56) References Cited

U.S. PATENT DOCUMENTS 2,653,988 A * 9/1953 Rupp .................... H01M 50/20
180/68.5
2,994,395 A * 8/1961 Hall ........................ B60R 16/04
180/68.5
(Continued)

FOREIGN PATENT DOCUMENTS

CN    106684276 A * 5/2017 .......... H01M 2/1077
DE    102014221944 A1    4/2016
(Continued)

OTHER PUBLICATIONS

Komatsu, JPS60138263U machine translation (Year: 1985).*
(Continued)

*Primary Examiner* — Ula C Ruddock
*Assistant Examiner* — Anna Korovina
(74) *Attorney, Agent, or Firm* — David B. Kelley; Carlson, Gaskey & Olds, P.C.

(57) ABSTRACT

A battery pack includes an enclosure assembly, a battery assembly housed within the enclosure assembly, a mounting structure secured to the enclosure assembly, and a mounting clamp that includes a first section mounted to the mounting structure and a second section contacting the battery assembly.

20 Claims, 6 Drawing Sheets

(51) Int. Cl.
*H01M 10/0525* (2010.01)
*H01M 50/262* (2021.01)
*H01M 50/211* (2021.01)

(52) U.S. Cl.
CPC ........ *H01M 50/262* (2021.01); *H01M 50/211* (2021.01); *H01M 2220/20* (2013.01)

(58) Field of Classification Search
CPC .......... Y02E 60/10; B60L 50/66; F16B 35/00; F16B 2/02; F16B 2/06
USPC ....................................... 180/68.5
See application file for complete search history.

(56) References Cited

U.S. PATENT DOCUMENTS

| | | | | |
|---|---|---|---|---|
| 3,167,458 | A * | 1/1965 | Brazell | H01M 50/289 |
| | | | | 429/10 |
| 3,894,607 | A * | 7/1975 | Brock | H01M 50/242 |
| | | | | 180/68.5 |
| 5,558,949 | A | 9/1996 | Iwatsuki et al. | |
| 5,639,571 | A | 6/1997 | Waters et al. | |
| 9,484,562 | B2 | 11/2016 | Utley et al. | |
| 2009/0325049 | A1 * | 12/2009 | Niedzwiecki | H01M 50/271 |
| | | | | 429/100 |
| 2010/0136396 | A1 | 6/2010 | Hermann et al. | |
| 2012/0263988 | A1 | 10/2012 | Obasih et al. | |
| 2014/0193694 | A1 | 7/2014 | Hoshi et al. | |
| 2015/0280183 | A1 | 10/2015 | Utley et al. | |
| 2016/0036018 | A1 * | 2/2016 | Gunna | B60L 50/64 |
| | | | | 429/100 |
| 2016/0036019 | A1 | 2/2016 | Gunna et al. | |
| 2016/0276718 | A1 * | 9/2016 | Prevost | B60K 1/04 |
| 2018/0151908 | A1 * | 5/2018 | An | H01M 50/244 |
| 2020/0411816 | A1 * | 12/2020 | Yoneyama | H01M 10/613 |

FOREIGN PATENT DOCUMENTS

| | | | | |
|---|---|---|---|---|
| DE | 102017204531 A1 * | 9/2018 | ............ | H01M 50/20 |
| EP | 3125332 A1 * | 2/2017 | ............ | B60L 11/1864 |
| JP | S60138263 U * | 9/1985 | ............ | Y02T 10/70 |
| JP | H0725247 * | 1/1995 | | |
| JP | 2012084239 A * | 4/2012 | | |
| JP | 2013122821 A * | 6/2013 | | |
| KR | 960001145 Y1 * | 2/1996 | ............ | H01M 50/20 |
| WO | WO-2017095001 A1 * | 6/2017 | ........ | H01M 10/0481 |

OTHER PUBLICATIONS

Choe (KR 960001145) Machine Translation (Year: 1996).*
Katayama JP 2013122821 Machine Translation (Year: 2013).*
Giere DE-102017204531 Machine Translation (Year: 2018).*
Lu CN-106684276 Machine Translation (Year: 2017).*
Kawaguchi JP-2012084239 Machine Translation (Year: 2012).*
Namiiri JPH0725247 Machine Translation (Year: 1995).*

* cited by examiner

MOUNTING CLAMPS FOR SECURING GROUPINGS OF BATTERY CELLS

CROSS-REFERENCE TO RELATED APPLICATION

This is a continuation of U.S. patent application Ser. No. 15/817,697, which was filed on Nov. 20, 2017.

TECHNICAL FIELD

This disclosure relates to mounting clamps for retaining battery assemblies within a battery pack enclosure assembly.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells are often packaged together in one or more assemblies that are housed inside an enclosure assembly. These assemblies may need secured relative to one another and/or relative to the enclosure assembly.

SUMMARY

A battery pack according to an exemplary aspect of the present disclosure includes, among other things, an enclosure assembly, a battery assembly housed within the enclosure assembly, a mounting structure secured to the enclosure assembly, and a mounting clamp including a first section mounted to the mounting structure and a second section contacting the battery assembly.

In a further non-limiting embodiment of the foregoing battery pack, the battery assembly includes a plurality of battery cells disposed along a first longitudinal axis.

In a further non-limiting embodiment of either of the foregoing battery packs, a second battery assembly including a plurality of battery cells is disposed along a second longitudinal axis that is laterally spaced from the first longitudinal axis.

In a further non-limiting embodiment of any of the foregoing battery packs, the mounting clamp includes a third section contacting the second battery assembly.

In a further non-limiting embodiment of any of the foregoing battery packs, the first section is a base of the mounting clamp and the second section is a flexible wing of the mounting clamp.

In a further non-limiting embodiment of any of the foregoing battery packs, the flexible wing includes an end flange that contacts a top surface of the battery assembly.

In a further non-limiting embodiment of any of the foregoing battery packs, the mounting clamp includes a base, a first flexible wing protruding laterally away from the base, and a second flexible wing protruding laterally away from the base.

In a further non-limiting embodiment of any of the foregoing battery packs, the base includes a fastener platform having an opening for receiving a fastener.

In a further non-limiting embodiment of any of the foregoing battery packs, the fastener extends into the mounting structure.

In a further non-limiting embodiment of any of the foregoing battery packs, the base includes a first plurality of cut-outs, and each of the first flexible wing and the second flexible wing includes a second plurality of cut-outs.

In a further non-limiting embodiment of any of the foregoing battery packs, a bridge extends between the first flexible wing and the second flexible wing.

In a further non-limiting embodiment of any of the foregoing battery packs, the bridge is established by a first tab extending from the first flexible wing and a second tab extending from the second flexible wing.

In a further non-limiting embodiment of any of the foregoing battery packs, the second tab overlaps the first tab.

In a further non-limiting embodiment of any of the foregoing battery packs, the mounting clamp includes a base, a flexible wing protruding away from the base, and an end flange disposed at an opposite end of the flexible wing from the base.

In a further non-limiting embodiment of any of the foregoing battery packs, the mounting structure is a T-bracket.

A battery pack according to another exemplary aspect of the present disclosure includes, among other things, a first grouping of battery cells disposed along a first longitudinal axis and a second grouping of battery cells disposed along a second longitudinal axis laterally spaced from the first longitudinal axis. A mounting clamp is disposed between the first and second groupings of battery cells and includes a first end flange touching the first grouping of battery cells and a second end flange touching the second grouping of battery cells.

In a further non-limiting embodiment of the foregoing battery pack, the mounting clamp includes a base, a first flexible wing protruding laterally away from the base, and a second flexible wing protruding laterally away from the base.

In a further non-limiting embodiment of either of the foregoing battery packs, the first end flange is part of the first flexible wing and the second end flange is part of the second flexible wing.

In a further non-limiting embodiment of any of the foregoing battery packs, each of the base and the first and second flexible wings includes weight reducing cut-outs.

In a further non-limiting embodiment of any of the foregoing battery packs, the mounting clamp includes a base that is mounted to a mounting structure disposed between the first and second groupings of battery cells.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a battery assembly and a mounting clamp for retaining the battery assembly within a battery pack enclosure assembly. The mounting clamp is configured to exert a clamping load against the battery assembly, thereby arresting movement of the battery assembly along an axis. These and other features are discussed in greater detail in the following paragraphs of this detailed description.

Figure 1:
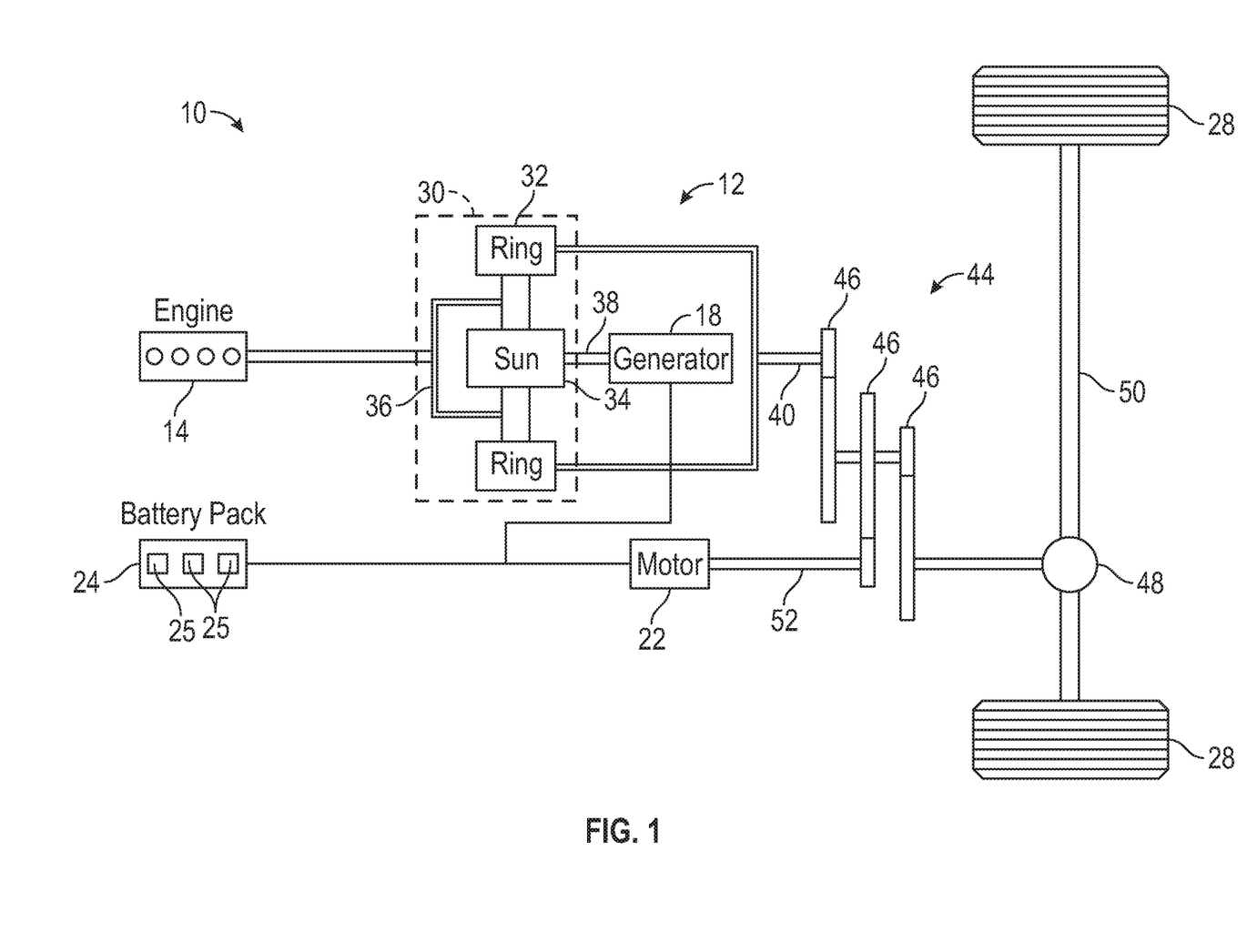
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (HEV's), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
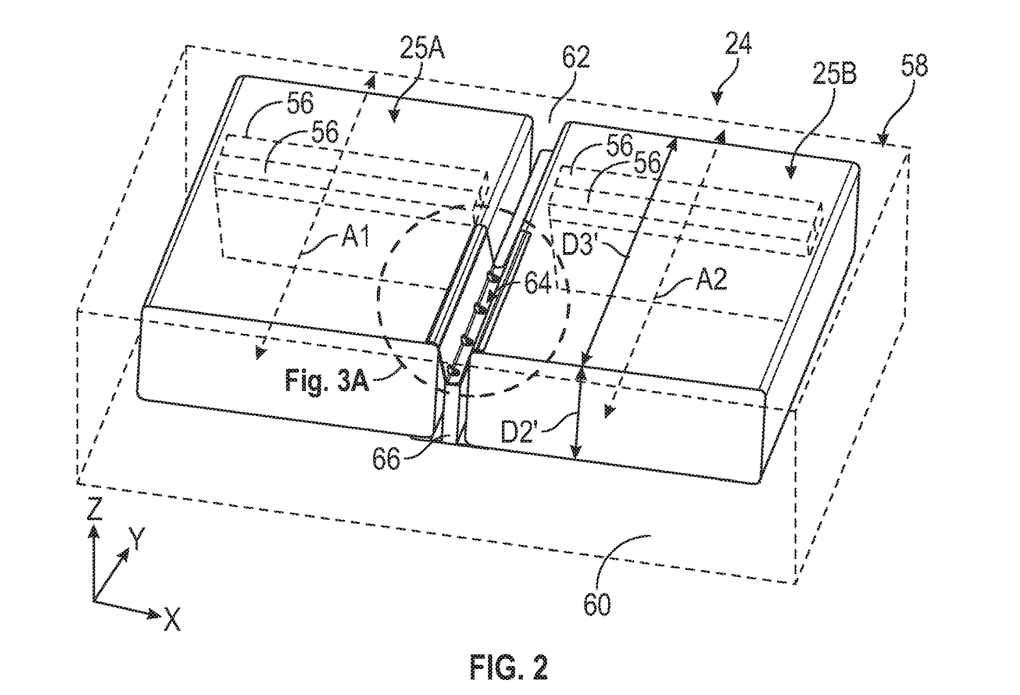
FIG. 2 illustrates a battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1. FIG. 2 is a perspective view of the battery pack 24, and some external components (e.g., an enclosure assembly 58) are shown in phantom to better illustrate the internal components of the battery pack 24.

The battery pack 24 houses a plurality of battery cells 56 that store energy for powering various electrical loads of the electrified vehicle 12. The battery pack 24 could employ any number of battery cells within the scope of this disclosure, and this disclosure is not limited to the exact configuration shown in FIG. 2.

The battery cells 56 may be stacked side-by-side to construct a grouping of battery cells 56, sometimes referred to as a "cell stack" or "cell array." In an embodiment, the battery cells 56 are pouch, lithium-ion cells held by interlocking mounting frames. However, battery cells having other geometries (cylindrical, prismatic, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery assembly. The battery pack 24 depicted in FIG. 2 includes a first battery assembly 25A and a second battery assembly 25B that is side-by-side with the first battery assembly 25A. Although the battery pack 24 of FIG. 2 is depicted as having a two battery assemblies, the battery pack 24 could include a greater number of battery assemblies within the scope of this disclosure.

The battery cells 56 of the first battery assembly 25A are distributed along a first longitudinal axis A1, and the battery cells 56 of the second battery assembly 25B are distributed along a second longitudinal axis A2. In an embodiment, the first longitudinal axis A1 is laterally spaced from the second longitudinal axis A2. The first and second battery assemblies 25A, 25B are therefore positioned side-by-side relative to one another in this embodiment.

An enclosure assembly 58 houses each battery assembly 25A, 25B of the battery pack 24. In an embodiment, the enclosure assembly 58 is a sealed enclosure that includes a tray 60 and a cover 62 that is secured to the tray 60 to enclose and seal each battery assembly 25A, 25B of the battery pack 24. In an embodiment, the first and second battery assemblies 25A, 25B are both positioned atop the tray 60 of the enclosure assembly 58, and the cover 62 may be received over the first and second battery assemblies 25A, 25B. The enclosure assembly 58 may include any size, shape, and configuration within the scope of this disclosure.

Figure 3A:
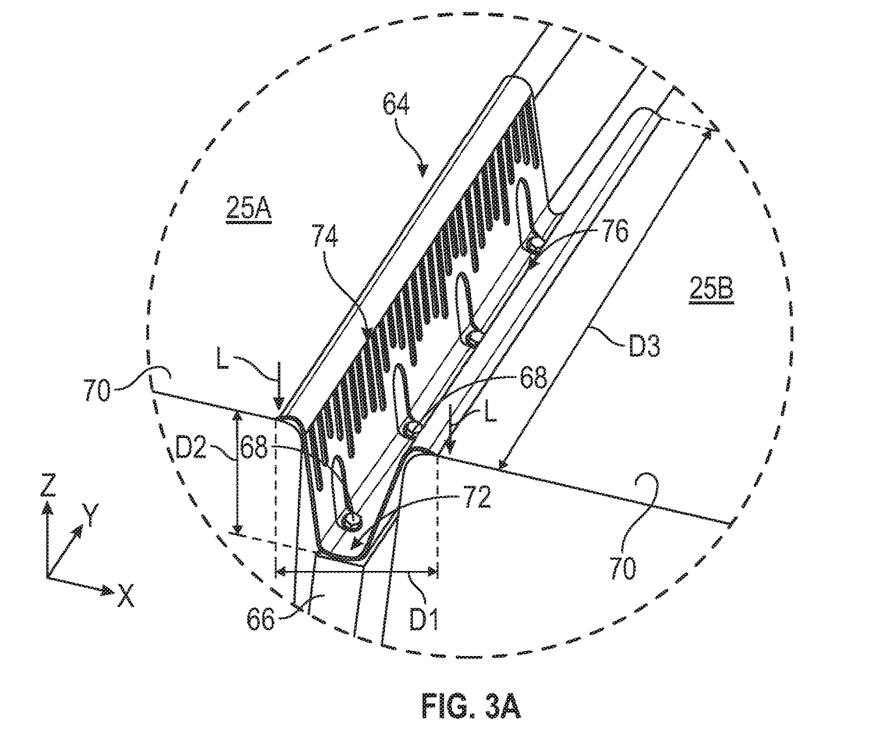
FIG. 3A is a blown up view of select portions of the battery pack of FIG. 2.

Referring to FIGS. 2 and 3A, a mounting clamp 64 is disposed between the first battery assembly 25A and the second battery assembly 25B. The mounting clamp 64 is configured to apply clamping loads L for retaining the first and second battery assemblies 25A, 25B relative to the enclosure assembly 58. In an embodiment, the mounting clamp 64 applies the clamping loads L in a vertical direction (i.e., along a z-axis relative to the battery assemblies 25A, 25B). Thus, in this exemplary embodiment, the mounting clamp 64 resists movement of the battery assemblies 25A, 25B in the z-axis direction to retain the battery assemblies 25A, 25B against the tray 60 of the enclosure assembly 58.

The mounting clamp 64 includes a first dimension D1 extending along an x-axis (or horizontal axis), a second dimension D2 extending along a z-axis (or vertical axis), and a third dimension D3 extending along the y-axis (or longitudinal axis). In an embodiment, the second dimension D2 of the mounting clamp 64 is less than a second dimension D2' of the battery assemblies 25A, 25B along the z-axis, and the third dimension D3 of the mounting clamp 64 is less than a third dimension D3' of the battery assemblies 25A, 25B along the y-axis. In other words, in an embodiment, the length and height of the mounting clamp 64 are smaller than the length and height of the first and second battery assemblies 25A, 25B. However, the actual size of the mounting clamp 64 relative to the battery assemblies 25A, 25B is not intended to limit this disclosure.

In an embodiment, the mounting clamp 64 is made of a plastic material, such as nylon. In another embodiment, the mounting clamp 64 is made of a metallic material, such as steel. Other materials are also contemplated within the scope of this disclosure.

In another embodiment, the mounting clamp 64 is fixedly secured to a mounting structure 66 that protrudes upwardly from the tray 60 and is disposed at a location axially between the first and second battery assemblies 25A, 25B. The mounting structure 66 could be any component of the battery pack 24. In an embodiment, the mounting structure 66 is an integral component of the enclosure assembly 58. In another embodiment, the mounting structure 66 is a T-bracket that is fixedly mounted to the tray 60 for separating the first battery assembly 25A from the second battery assembly 25B of the battery pack 24. One or more fasteners 68, such as threaded fasteners, may be inserted through the mounting clamp 64 and into the mounting structure 66 for retaining the battery assembles 25A, 25B within the enclosure assembly 58.

Although fixedly secured to the mounting structure 66, the mounting clamp 64 is not fixedly secured to either of the battery assemblies 25A, 25B. Instead, a portion of the mounting clamp 64 extends along and contacts a top surface 70 of each battery assembly 25A, 25B. The top surface 70 may be established by interlocking mounting frames that hold the battery cells 56. As discussed in greater detail below, the portions of the mounting clamp 64 that are contiguous with the top surfaces 70 of the battery assemblies 25A, 25B may slightly move or slide relative to the top surfaces 70 during battery pack loading events. However, the mounting clamp 64 is designed to maintain the clamping loads even as these portions are displaced relative to the top surfaces 70 of the battery assemblies 25A, 25B.

Figure 3B:
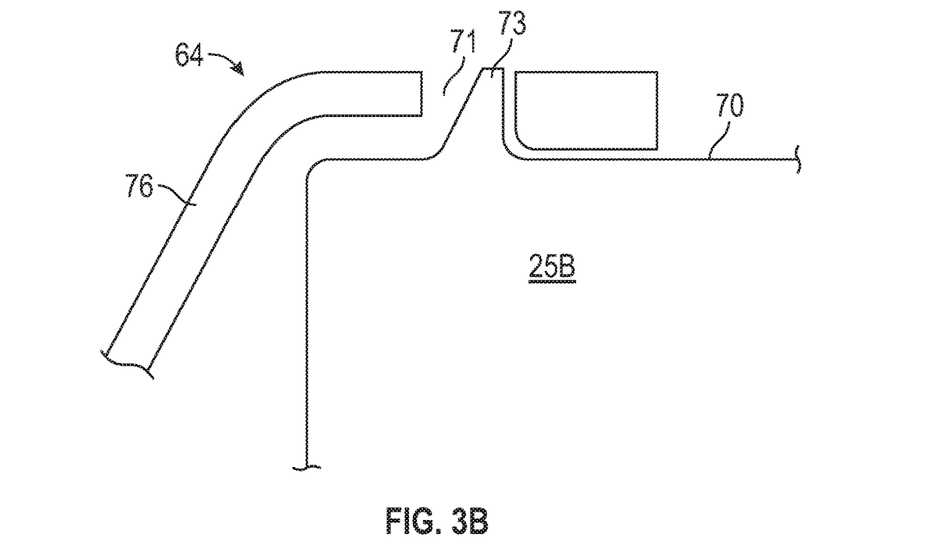
FIG. 3B illustrates an exemplary interconnection between a battery assembly and a mounting clamp of a battery pack.

In another embodiment, shown in FIG. 3B, the portion (here, a flexible wing 76) of the mounting clamp 64 that contacts the top surface 70 of each battery assembly 25A, 25B may include a slot 71 that is configured to be received over a nub 73 that protrudes outwardly from the top surface 70. The nub 73 may be hook-shaped, in an embodiment. The interconnection between the nub 73 and slot 71 helps prevent the portion of the mounting clamp 64 from slipping off of the top surface 70.

Figure 4A:
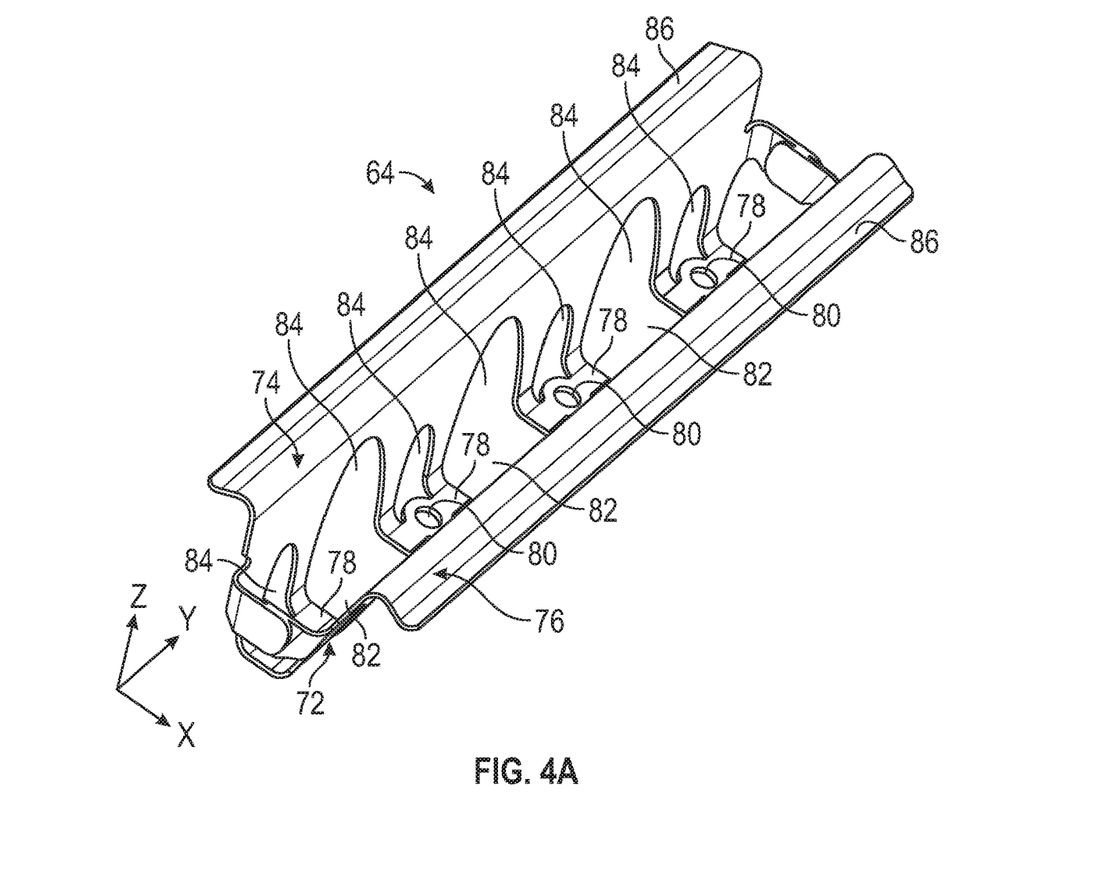
FIGS. 4A, 4B, 4C, 4D, and 4E illustrate an exemplary mounting clamp of the battery pack of FIGS. 2 and 3A.
Figure 4B:
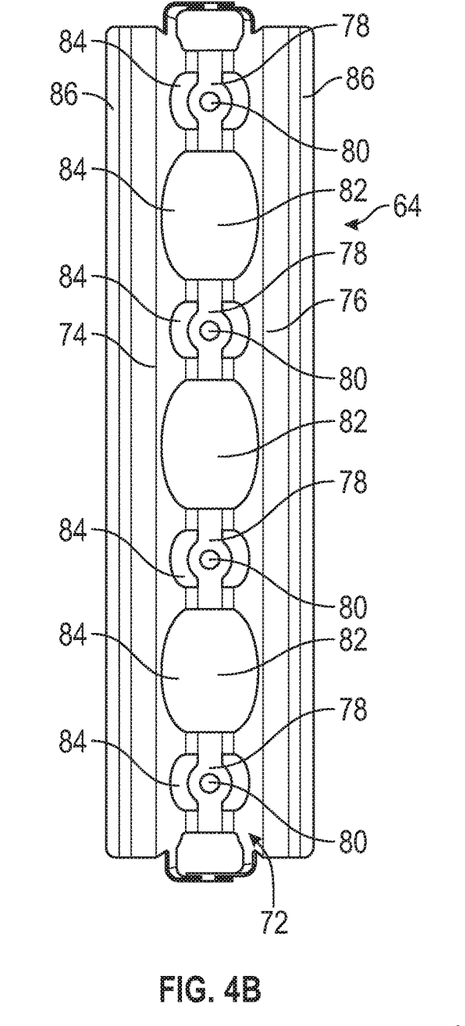
Figure 4C:
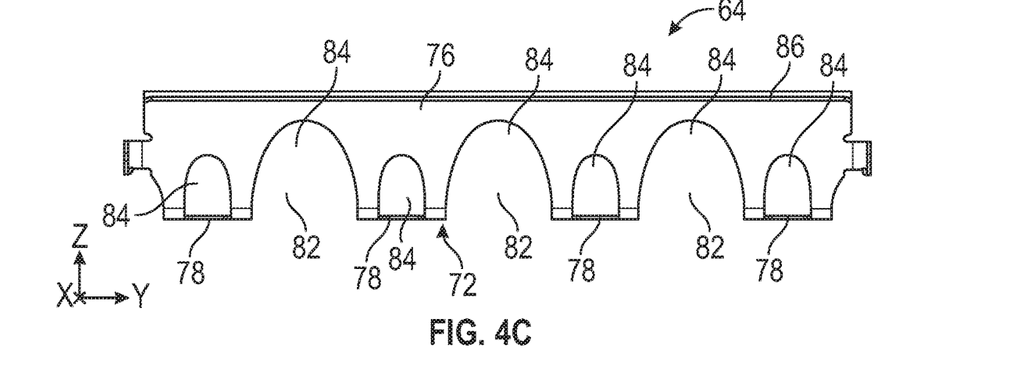
Figure 4D:
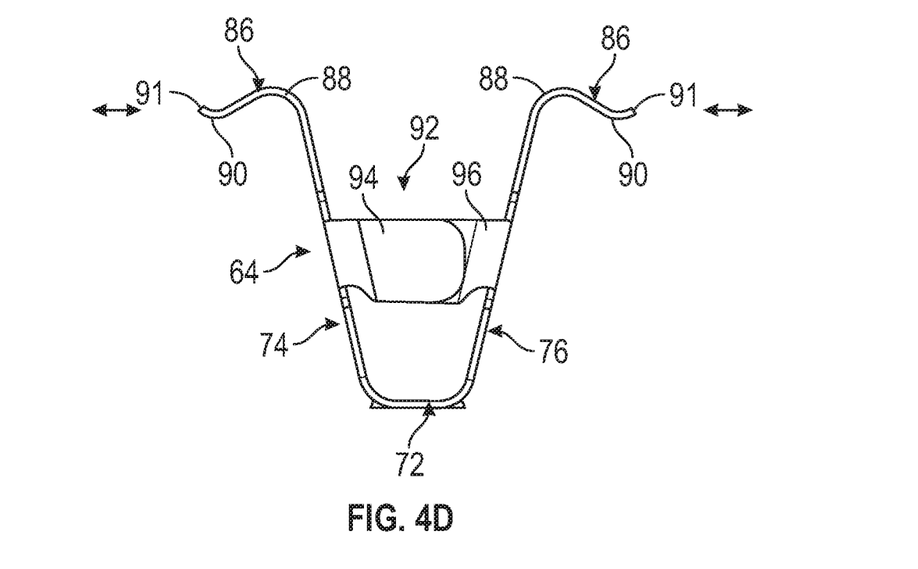
Figure 4E:
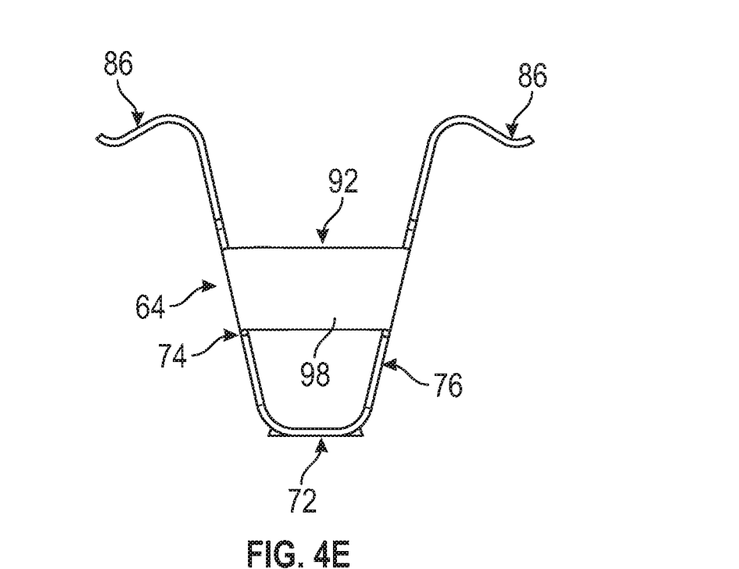

FIGS. 4A-4E, with continued reference to FIGS. 2-3A, illustrate additional details of the exemplary mounting clamp 64 described above. FIG. 4A is a perspective view, FIG. 4B is a top view, FIG. 4C is a side view, and FIGS. 4D and 4E are end views of the mounting clamp 64.

The mounting clamp 64 may include a base 72, a first flexible wing 74, and a second flexible wing 76. The first flexible wing 74 and the second flexible wing 76 may extend laterally and upwardly away from the base 72. Together, the base 72, the first flexible wing 74, and the second flexible wing 76 establish a monolithic structure having no mechanical fasteners. When mounted, the base 72 interfaces with the mounting structure 66, the first flexible wing 74 interfaces with the first battery assembly 25A, and the second flexible wing 76 interfaces with the second battery assembly 25B (see FIG. 3A).

In an embodiment, the mounting clamp 64 is generally V-shaped. The V-shaped configuration is best illustrated in FIGS. 4A and 4D. However, other shapes are also contemplated within the scope of this disclosure (see, e.g., the embodiment of FIGS. 5 and 6).

The base 72 may include one or more fastener platforms 78. Each fastener platform 78 includes an opening 80 for receiving a fastener (see feature 68 of FIGS. 2-3A). One fastener may be received through each opening 80, and then into the mounting structure 66, for fixedly securing the mounting clamp 64 axially between the first and second battery assemblies 25A, 25B.

The base 72 may additionally include one or more cut-out sections 82 for reducing the weight of the mounting clamp 64. In an embodiment, the cut-out sections 82 extend through the base 72 and are disposed between adjacent fastener platforms 78.

The first flexible wing 74 and the second flexible wing 76 may also include a plurality of cut-out sections 84. A first portion of the cut-out sections 84 may connect to the cut-out sections 82 of the base 72, and a second portion of the cut-out sections 84 may partially surround the fastener platforms 78 of the base 72.

In an embodiment, the cut-out sections 84 of the first and second flexible wings 74, 76 are arch-shaped. However, other shapes are contemplated within the scope of this disclosure. The size and shape of the various cut-out sections 82, 84 of the mounting clamp 64 are designed to distribute stresses and further reduce the weight of the mounting clamp 64. Additionally, the cutout sections 82, 84 are designed to reduce the minimum space required between arrays due to the need for tool clearance/access to the fasteners 68 during assembly.

In yet another embodiment, each of the first flexible wing 74 and the second flexible wing 76 includes an end flange 86 located at an end of the mounting clamp 64 that is opposite from the base 72. The end flanges 86 are the portions of the mounting clamp 64 that extend over top of the first and second battery assemblies 25A, 25B for exerting the clamping loads L, thereby substantially resisting movement of the battery assemblies 25A, 25B in the z-axis direction. The end flanges 86 may contact the top surface 70 of each battery assembly 25A, 25B and are configured to slide along the top surfaces 70 as the first and second wings 74, 76 flex during battery pack loading events. The clamping loads L are maintained by the end flanges 86 even as the first and second flexible wings 74, 76 flex or otherwise move.

As best illustrated in FIG. 4D, the end flanges 86 may be curved, which may be beneficial for distributing the amount of force being applied to the tops of the battery assemblies 25A, 25B. The curvature of the end flanges 86 may also create springs that provide a variable spring load effect to the top surface 70 of the battery assemblies 25A, 25B, thus resulting in linearly increasing loads rather than a constant load value. The linear spring and varying load can also account for array and clamp height variations and help minimize tolerance issues.

In an embodiment, the end flanges 86 includes a first curved portion 88 that curves in a direction toward the base 72 of the enclosure assembly 58 and a second curved portion 90 that curves in a direction away from the base 72. Other end flange configurations are also contemplated within the scope of this disclosure (see, e.g., the mounting clamp embodiment of FIG. 6). The end flanges 86 may contact the battery assemblies 25A, 25B near the location of the second curved portions 90, which in this embodiment are located closer to a distal-most end 91 of the end flanges 86.

A bridge 92 may extend between the first flexible wing 74 and the second flexible wing 76 of the mounting clamp 64. The bridge 92 is configured to increase the stiffness of the first and second flexible wings 74, 76. Therefore, the bridge 92 influences the amount of clamping forces exerted by the mounting clamp 64.

In a first embodiment, shown in FIG. 4D, the first flexible wing 74 includes a first tab 94 and the second flexible wing 76 includes a second tab 96 that extends toward the first flexible wing 74 and overlaps the first tab 94. The second tab 96 may be spot welded or otherwise secured to the first tab 94 to establish the bridge 92. Spot welding the bridge 92 shifts the axis of rotation about the flexible wings 74, 76 upwardly in the z-axis direction, thereby shortening the moment arm of the flexible wings 74, 76 and strengthening the mounting clamp 64.

In a second embodiment, shown in FIG. 4E, a single tab 98 extends from the first flexible wing 74 to the second flexible wing 76 to establish the bridge 92.

Figure 5:
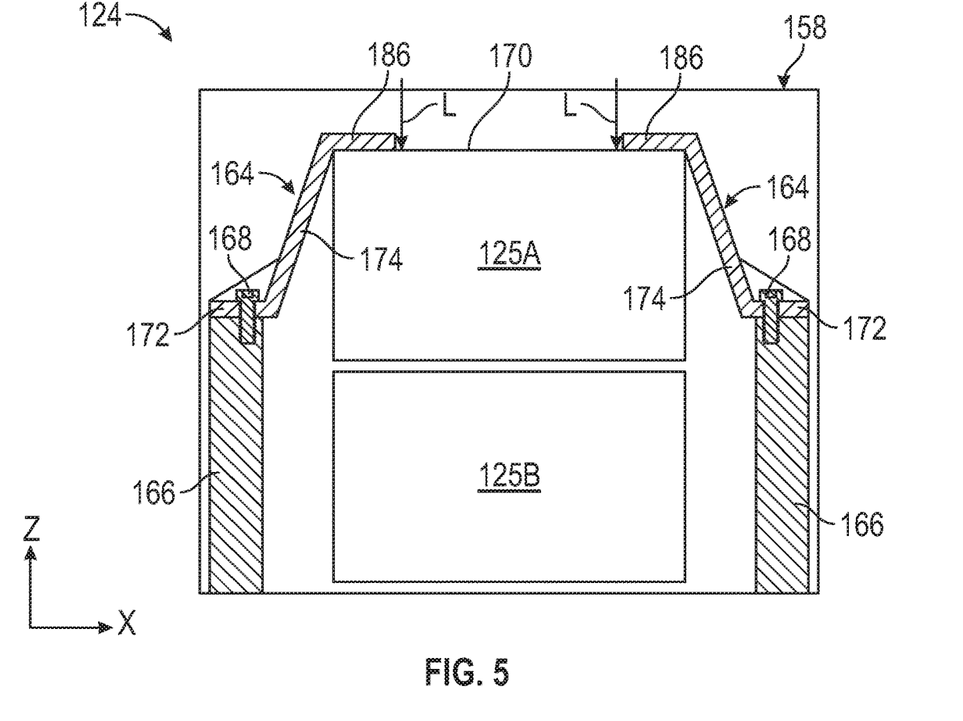
FIG. 5 illustrates another exemplary battery pack.

FIG. 5 illustrates a battery pack 124 according to another embodiment of this disclosure. The battery pack 124 may include an enclosure assembly 158 that houses a first battery assembly 125A and a second battery assembly 125B. Unlike the embodiment of FIG. 2, the first battery assembly 125A of the battery pack 124 is stacked on top of the second battery assembly 125B rather than side-by-side with the second battery assembly 125B.

One or more mounting clamps 164 may be secured inside the enclosure assembly 158 for exerting clamping loads L against the first and second battery assemblies 125A, 125B. In an embodiment, two mounting clamps 164 are utilized, with one mounting clamp 164 positioned on each lateral side of the battery assemblies 125A, 125B. Although clamping loads L are shown being asserted against two battery assemblies 125A, 125B in FIG. 5, the mounting clamp 164 can be configured to assert clamping loads against one or more battery assemblies.

The mounting clamps 164 are configured to apply clamping loads L in a vertical direction (i.e., along a z-axis) directly against the first battery assembly 125A. Since the first battery assembly 125A is stacked on top of the second battery assembly 125B, the clamping loads L are indirectly applied to the second battery assembly through the first battery assembly 125A. Thus, in this exemplary embodiment, the mounting clamps 164 arrest z-direction movement of both the first and second battery assemblies 125A, 125B.

Each mounting clamp 164 may be fixedly secured to a mounting structure 166 (two shown) located within the enclosure assembly 158. One mounting structure 166 is shown positioned on each lateral side of the first and second battery assemblies 125A, 125B. In an embodiment, the mounting structures 166 are integral components of the enclosure assembly 158. In another embodiment, the mounting structures 166 are T-brackets that are fixedly mounted to a portion of the enclosure assembly 158. One or more fasteners 168, such as threaded fasteners, may be inserted through the mounting clamps 164 and into the mounting structures 166 for restricting z-axis movement of the battery assembles 125A, 125B.

Although fixedly secured to each mounting structure 166, the mounting clamps 164 are non-fixedly secured to either of the battery assemblies 125A, 125B. Instead, a portion of each mounting clamp 164 extends along and contacts a top surface 170 of the first battery assembly 125A to apply the clamping loads L.

Figure 6:
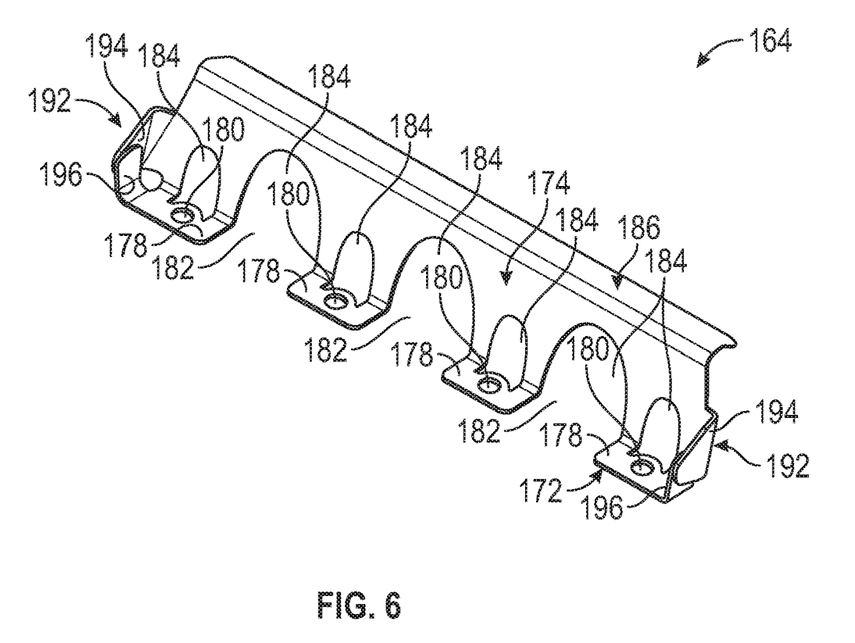
FIG. 6 illustrates an exemplary mounting clamp of the battery pack of FIG. 5.

FIG. 6, with continued reference to FIG. 5, illustrates additional details of the exemplary mounting clamp 164. The mounting clamp 164 may include a base 172, a flexible wing 174, and an end flange 186. The flexible wing 174 may extend laterally and upwardly away from the base 172. Together, the base 172, the flexible wing 174, and the end flange 186 establish a monolithic structure having no mechanical fasteners. When mounted, the base 172 interfaces with the mounting structure 166 and the end flange 186 interfaces with the first battery assembly 125A (see FIG. 5).

In an embodiment, the mounting clamp 164 is generally Z-shaped. However, other shapes are further contemplated within the scope of this disclosure (see, e.g., the embodiment of FIGS. 4A-4D).

The base 172 may include one or more fastener platforms 178. Each fastener platform 178 includes an opening 180 for receiving a fastener (see feature 168 of FIG. 5). One fastener may be received through each opening 180 and then into the mounting structure 166 for fixedly securing the mounting clamp 164 within the battery pack 124.

The base 172 may additionally include one or more cut-out sections 182 for reducing the weight of the mounting clamp 164. In an embodiment, the cut-out sections 182 extend through the base 172 and are disposed between adjacent fastener platforms 178 of the base 172.

The flexible wing 174 may also include a plurality of cut-out sections 184. A first portion of the cut-out sections 184 may connect to the cut-out sections 182 of the base 172, and a second portion of the cut-out sections 184 may partially surround the fastener platforms 178 of the base 172.

In an embodiment, the cut-out sections 184 of the flexible wing 174 are arch-shaped. However, other shapes are contemplated within the scope of this disclosure. The size and shape of the various cut-out sections 182, 184 of the mounting clamp 164 are designed to distribute stresses and further reduce the weight of the mounting clamp 164.

The end flange 186 is located at an opposite end of the flexible wing 174 from the base 172. The end flange 186 is the portion of the mounting clamp 164 that extends over top of the first battery assembly 125A for exerting the clamping loads L, thereby substantially resisting movement of the battery assemblies 125A, 125B in the z-axis direction.

A bridge 192 may extend between the flexible wing 174 and the base 172 at each opposing end of the mounting clamp 164. The bridge 192 is configured to increase the stiffness of the mounting clamp 164. In an embodiment, the flexible wing 174 includes a first tab 194 and the base 172 includes a second tab 196 that overlaps the first tab 194. The second tab 196 may be welded or otherwise secured to the first tab 194 to establish the bridge 192.

The battery packs of this disclosure include mounting clamps for retaining groupings of battery cells within the pack. The exemplary mounting clamps provide a cost effective and light weight structure for retaining battery assemblies while achieving clamping load requirements.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    an enclosure assembly;
    a battery assembly housed within the enclosure assembly;
    a mounting structure secured to the enclosure assembly; and
    a mounting clamp including a first section mounted to the mounting structure and a second section contacting the battery assembly,
    wherein the second section includes a slot that is configured to be received over a nub that protrudes from the battery assembly,
    wherein the slot is formed through the second section, and the nub extends completely through the slot such that at least a portion of the nub is above the second section, whereby the nub establishes a top-most surface of the battery assembly.

2. The battery pack as recited in claim 1, wherein the battery assembly includes a plurality of battery cells disposed along a first longitudinal axis.

3. The battery pack as recited in claim 2, comprising a second battery assembly including a plurality of battery cells disposed along a second longitudinal axis that is laterally spaced from the first longitudinal axis.

4. The battery pack as recited in claim 3, wherein the mounting clamp includes a third section contacting the second battery assembly.

5. The battery pack as recited in claim 4, wherein the third section includes a second slot that is configured to be received over a second nub that protrudes from the second battery assembly.

6. The battery pack as recited in claim 1, wherein the first section is a base of the mounting clamp and the second section is a flexible wing of the mounting clamp.

7. The battery pack as recited in claim 6, wherein the flexible wing includes an end flange that contacts a top surface of the battery assembly, and further wherein the slot is formed in the end flange.

8. The battery pack as recited in claim 1, wherein the mounting clamp includes a base, a first flexible wing protruding laterally away from the base, and a second flexible wing protruding laterally away from the base.

9. The battery pack as recited in claim 8, wherein the base includes a fastener platform having an opening for receiving a fastener.

10. The battery pack as recited in claim 9, wherein the fastener extends into the mounting structure.

11. The battery pack as recited in claim 8, wherein the base includes a first plurality of cut-outs and each of the first flexible wing and the second flexible wing includes a second plurality of cut-outs.

12. The battery pack as recited in claim 1, wherein the mounting clamp includes a base, a flexible wing protruding away from the base, and an end flange disposed at an opposite end of the flexible wing from the base, and further wherein the slot is formed in the end flange.

13. The battery pack as recited in claim 1, wherein the mounting structure is a T-bracket.

14. A battery pack, comprising:
    an enclosure assembly;
    a first grouping of battery cells housed within the enclosure assembly and arranged along a first longitudinal axis;
    a second grouping of battery cells housed within the enclosure assembly and arranged along a second longitudinal axis that is laterally offset from and parallel to the first longitudinal axis; and
    a mounting clamp disposed between the first and second groupings of battery cells and including a first end flange touching a top-most surface the first grouping of battery cells and a second end flange touching a top-most surface of the second grouping of battery cells, wherein the first grouping of battery cells extends across a first length along the first longitudinal axis and the mounting clamp extends across a second length that is smaller than the first length.

15. The battery pack as recited in claim 14, wherein the mounting clamp includes a base, a first flexible wing protruding laterally away from the base, and a second flexible wing protruding laterally away from the base, wherein the first end flange is part of the first flexible wing and the second end flange is part of the second flexible wing.

16. The battery pack as recited in claim 14, comprising a mounting structure disposed between the first and second groupings of battery cells, wherein the mounting clamp includes a base that is mounted to the mounting structure.

17. The battery pack as recited in claim 14, wherein the first end flange extends across portions of the top-most surface of the first grouping of battery cells at a first side of the first grouping of battery cells and terminates prior to reaching a second side of the first grouping of battery cells.

18. A battery pack, comprising:
- an enclosure assembly including a tray and a cover secured to the tray;
- a first grouping of battery cells housed within the enclosure assembly and arranged along a first longitudinal axis;
- a second grouping of battery cells housed within the enclosure assembly and arranged along a second longitudinal axis that is laterally offset from and parallel to the first longitudinal axis;
- a T-bracket mounted to the tray; and
- a mounting clamp disposed between the first and second groupings of battery cells,
- wherein the mounting clamp includes a base mounted to the T-bracket, a first flexible wing extending away from the base and including a first end flange touching a top-most surface of the first grouping of battery cells, and a second flexible wing extending away from the base and including a second end flange touching a top-most surface of the second grouping of battery cells.

19. The battery pack as recited in claim 18, wherein the top-most surface of the first grouping of battery cells is established by interlocking mounting frames that hold battery cells of the first grouping of battery cells.

20. The battery pack as recited in claim 1, wherein the nub protrudes from an interlocking mounting frame of the battery assembly.

* * * * *